United States Patent [19]

Van Marcke

[11] Patent Number: 5,086,526
[45] Date of Patent: * Feb. 11, 1992

[54] BODY HEAT RESPONSIVE CONTROL APPARATUS

[75] Inventor: Karel C. Van Marcke, Kruishoutem, Belgium

[73] Assignee: International Sanitary Ware Manufacturin Cy, S.A., Kruishoutem, Belgium

[*] Notice: The portion of the term of this patent subsequent to Jul. 17, 2007 has been disclaimed.

[21] Appl. No.: 549,220

[22] Filed: Jul. 6, 1990

Related U.S. Application Data

[63] Continuation-in-part of Ser. No. 419,315, Oct. 10, 1989, Pat. No. 4,941,219.

[51] Int. Cl.⁵ .................................................. E03C 1/05
[52] U.S. Cl. .................................... 4/623; 251/129.04
[58] Field of Search .................... 4/623, 302, 304, 305, 4/DIG. 3, 31.3; 251/129.04, 129.03, 129.02; 137/607

[56] References Cited

U.S. PATENT DOCUMENTS

| | | | |
|---|---|---|---|
| 3,551,919 | 1/1971 | Forbes | 4/623 |
| 3,576,277 | 4/1971 | Blackmon | 222/1 |
| 3,588,038 | 6/1971 | Tanaka | 251/129 |
| 4,520,516 | 6/1985 | Parsons | 4/623 |
| 4,598,726 | 7/1986 | Pepper | 137/1 |
| 4,651,777 | 3/1987 | Hardman | 137/487.5 |
| 4,681,141 | 7/1987 | Wang | 137/607 |
| 4,682,628 | 7/1987 | Hill | 137/624 |
| 4,688,277 | 8/1987 | Kakinoki et al. | 4/623 |
| 4,709,728 | 12/1987 | Ying-Chung | 137/636.4 |
| 4,735,357 | 4/1988 | Gregory et al. | 236/93 |
| 4,741,363 | 5/1988 | Hu | 137/607 |
| 4,742,583 | 5/1988 | Yoshida | 4/623 X |
| 4,762,273 | 8/1988 | Gregory et al. | 236/93 |
| 4,823,414 | 4/1989 | Piersimoni et al. | 4/623 |
| 4,826,129 | 5/1989 | Fong et al. | 251/129.04 |
| 4,838,310 | 6/1989 | Scott et al. | 251/129.04 X |
| 4,872,485 | 10/1989 | Laverty, Jr. | 251/129.04 X |
| 4,894,874 | 1/1990 | Wilson | 4/623 |

*Primary Examiner*—Henry J. Recla
*Assistant Examiner*—Robert M. Fetsuga
*Attorney, Agent, or Firm*—Cahill, Sutton & Thomas

[57] ABSTRACT

A low voltage battery energized passive detection system generates a control signal in response to radiated heat from a human body part to energize, for settable periods of time water flow valves and ancillary equipment that may be associated with the act of washing. To minimize power demand, a programmable microchip may be employed as a control unit and have external settable parameters.

24 Claims, 9 Drawing Sheets

BODY HEAT RESPONSIVE CONTROL APPARATUS

CROSS REFERENCE TO RELATED APPLICATIONS

The present application is a continuation in part application of a pending patent application entitled "BODY HEAT RESPONSIVE VALVE CONTROL APPARATUS", filed on Oct. 10, 1989 and assigned Ser. No. 419,315 and now U.S. Pat. No. 4,941,219 and describing an invention made by the present inventor.

BACKGROUND OF THE INVENTION

1. Field of the Invention

The present invention relates to control systems and, more particularly, to low DC voltage detection systems responsive to radiated body heat for operating various apparatus.

2. Description of the Prior Art

Single or multi user wash basins used in industrial, commercial or public environments provide a source of water on demand for cleansing a user's hands, face and other body parts. Water flow valve actuating mechanisms are often manually or foot operated lever type devices to permit relative ease of use. The manually operated lever type devices may become soiled or otherwise damaged due to dirt and other contamination present on a user's hands prior to washing. The foot operated lever type devices are often subjected to abuse.

Dispensation of soap, whether liquid or powder, is usually achieved by manually operating a lever, a push button or a squeeze bottle; adaptations for operating such devices by foot are also known. To dry oneself, a user must manually grasp and pull individual folded paper towels from a dispenser, pull and tear off paper towels from a roll, pull down an endless cloth towel from an enclosed feed roller or push a button to actuate a hot air blower. All of these manually (and foot) operated devices accumulate a residue of dirt, bacteria and viruses at the locations of contact by the users. The constituents of this residue may contribute to the spread of disease and otherwise present a public health hazard.

To avoid the requirements for having a user physically actuate a valve in order to cause water flow at a wash basin, various sensors have been developed and incorporated with valve actuating mechanisms to sense the presence of a user at a wash basin. Actuating apparatus of this type have included devices for generating ultrasonic energy focused upon a detector; or, upon a change in the energy detected due to the presence of a user, a signal may be generated for actuating a water flow valve. In one water faucet device, the faucet is rotatable to permit automatic water flow actuation or require manual valve control as a function of the rotational position of the faucet. Various devices have been developed which include a light emitter with a corresponding detector. Upon interruption of the light path by a wash basin user, actuation of a water flow valve will occur. Audio responsive detectors for actuating water flow valves associated with water basins and the like are known. Infrared detector systems include a generator for generating a source of infrared energy and a detector responsive thereto. Upon interruption of the infrared energy by a user, circuitry is energized for actuating a water flow valve. Several devices have also been developed for sensing the radiant energy of a human body part and actuating a water flow valve upon such sensing.

A common characteristic of prior art related devices for sensing the presence of a user and actuating a water flow valve and other devices is that such systems are active systems. That is, a signal generator is provided with a corresponding receiver. A change in signal intensity sensed by the receiver related circuitry and in response to the presence of a user, is detected and serves as a triggering signal for actuating a valve. The requirement for transmission of a signal, in combination with signal detection circuitry, imposes a requirement for a relatively substantial power supply. Such power supply requirements in essence negate the use of low voltage small capacity batteries as the power supply.

SUMMARY OF THE INVENTION

A low voltage battery energized passive detection system generates a control signal in response to radiated heat from a human body to actuate a solenoid operated fluid flow valve for a predetermined limited time period unless an earlier cessation of body radiated heat triggers shut off of the valve. The configuration of the sensor in combination with its placement within a wash basin or upon a water spout establishes the configuration of the effective detection field to eliminate false signals. Additional timed and time dependent functions ancillary to washing, such as soap dispensation, air dryer operation and towel availability, can be energized. To avoid the possibility of the valve remaining open due to insufficient electrical power to effect closure of the valve, a fail safe circuit can be used to close and disable the valve in the closed position when the voltage of the power supply drops below a predetermined value.

It is therefore a primary object of the present invention to provide a passive detection system for detecting the presence of body heat within a defined detection field.

Another object of the present invention is to provide an automatically operated water basin for sensing the presence of body heat within a detection field.

Yet another object of the present invention is to provide a low DC power detection system responsive to the presence of a human body part for controlling actuation of water flow in a wash basin along with related and ancillary functions.

Yet another object of the present invention is to provide a flow control system for a wash basin which automatically terminates further flow upon sensing a reduced voltage power supply.

A further object of the present invention is to provide a water flow control system for wash basins having very low electrical power drain and operable in excess of a year or more by a low voltage low power battery source.

A still further object of the present invention is to provide the capability of operating a selected number of functions ancillary to water dispensation for washing purposes on a timed sequence and for a present duration.

A still further object of the present invention is to provide a miniaturized sensor and control circuit mountable within a water spout for sensing the presence of a human body part within a predetermined limited space.

A still further object of the present invention is to provide a water spout mounted sensor for sensing the presence of a human body part to operate a selected one of a plurality of functions.

A still further object of the present invention is to provide a method for operating a passive detection system responsive to the presence of a human body part within a detection field.

A yet further object of the present invention is to provide a method responsive to the presence of body heat for controlling the flow of water in a wash basin and for controlling selected ones of a plurality of functions ancillary to the act of washing.

These and other objects of the present invention will become apparent to those skilled in the art as the description thereof proceeds.

BRIEF DESCRIPTION OF THE DRAWINGS

The present invention will be described with greater clarity and specificity with reference to the following drawings, in which:

FIG. 1a illustrates a representative wash basin having superimposed therein the horizontal detection field attendant a wash basin mounted detector;

FIG. 1b is a representation of the horizontal detection field shown in FIG. 1a;

FIG. 2a is a partial cross sectional view of the wash basin and showing the vertical detection field therein attendant a wash basin mounted detector;

FIG. 2b illustrates the vertically reduced detection field within the wash basin;

FIG. 4a is a block diagram of a discrete component detection circuit;

FIG. 4b is a block diagram illustrating the electrical power source for the circuit depicted in FIG. 4a;

FIG. 9a illustrates a programmable control circuit with various input signal sources and controlled output devices;

FIG. 9b illustrates a power source for the control unit, signal sources and output devices shown in FIG. 9a.

DESCRIPTION OF THE PREFERRED EMBODIMENT

Public wash basins of the type used predominantly in various industrial, commercial and public establishments require manipulation of levers, knobs, handles or push buttons to bring about water flow. Often, each of a hot and cold water tap must be adjusted to obtain a satisfactory temperature of the outflowing water. Such ongoing contact by dirty and/or contaminated hands promotes spread of bacteria and viruses due to the final manual contact to turn off the water flow after one's hands have been washed. The transfer of bacteria and viruses will contribute to the spread of disease. Where such diseases are life threatening or permanently disabling, the risks of using public wash basins become intolerable. Similar risks exist in actuating soap dispensers, supplies of towels, air driers and other ancillary apparatus.

Preferably, the act of washing one's hands or face in a wash basin available to the public should not require physical contact with any part of the wash basin, associated implements or ancillary equipment. Apparatus for automatically discharging water should discharge such water at a preset temperature and for a period of time sufficient only to complete a washing function in order to conserve water. The operative elements should be actuated as a function of the proximity of the user's hands or body. Means should be employed to eliminate or prevent false actuation and means should be employed to terminate water flow prior to a preset time if use of the water ceases. Moreover, ancillary equipment should be operated commensurate with the timing of the washing operation.

Any electrical power source and any electrically energized components must be of sufficiently low voltage and power level to eliminate any electrical hazard. As many washing facilities are remote from a ready source of electrical power, the electrical power source for the actuating unit should be a low voltage battery. To permit extended uninterrupted operation, the power requirements of the operating system should have very low current consumption to permit use well in excess of a year and, preferably, for several years.

Figures 1A, 1B, 2A, 2B:
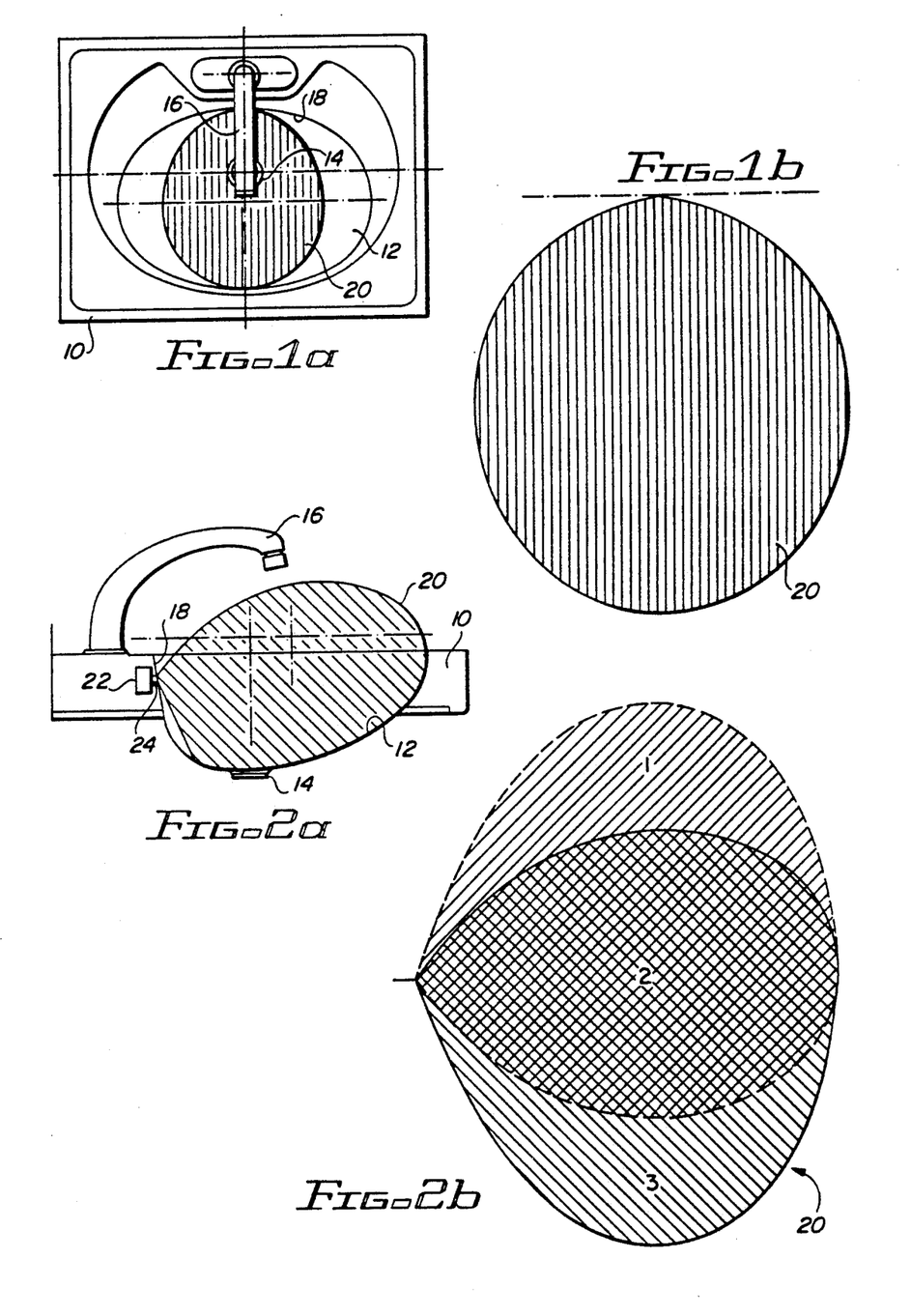

Referring to FIG. 1a, there is illustrated a top view of a representative wash basin 10. The wash basin includes a bowl 12, a drain 14 and a spout 16 for discharging water. To sense or detect the presence of the hands of a user, a detection field 20 is established primarily only within bowl 12. As illustrated in FIG. 1b, the horizontal configuration of detection field 20 is generally round or ellipsoidal in cross section and conforming to a horizontal plane through bowl 12.

The vertical configuration of detection field 20 is best illustrated in FIGS. 2a and 2b. A sensor 22, responsive to a heat source such as a human body part within detection field 20, is usually located, for example, in rear wall 18 of bowl 12. The vertical parameter of detection field 20 is limited at the lower half by bowl 12. The upper limit of the detection field may be mechanically limited by a restrictor 24 used in conjunction with sensor 22. As particularly illustrated in FIG. 2b, the original detection field for sensor 22 would include the volumes represented by areas 1, 2 and 3. Area 3 is eliminated by bowl 12, which bowl defines the lower perimeter of area 2. Upper area 1 may be eliminated by restrictor 24 operating in conjunction with the sensor. Accordingly, the detection field to which sensor 22 is responsive is essentially limited by the space within bowl 12 and extending in rounded manner slightly upwardly therefrom.

Figure 2C:
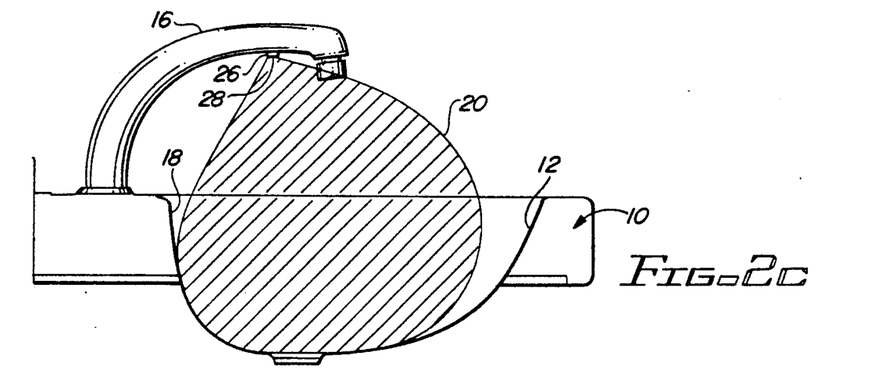
FIG. 2c illustrates a representative vertical cross sectional view of a detection field attendant a water spout mounted detector.

In certain applications it may be preferable to have the sensor, such as sensor 26, mounted upon water spout 16. Generally, detection field 20 will extend downwardly from sensor 26 into bowl 12 of wash basin 10. A restrictor 28 may be employed in conjunction with sensor 26 to define the downwardly extending cone angle or horizontal configuration and downward expansion rate of detection field 20.

Such limited detection field will prevent water flow during normal movement past wash basin 10 and essentially requires a user to place his hands or other body part essentially within the bowl of the water basin.

Figure 3:
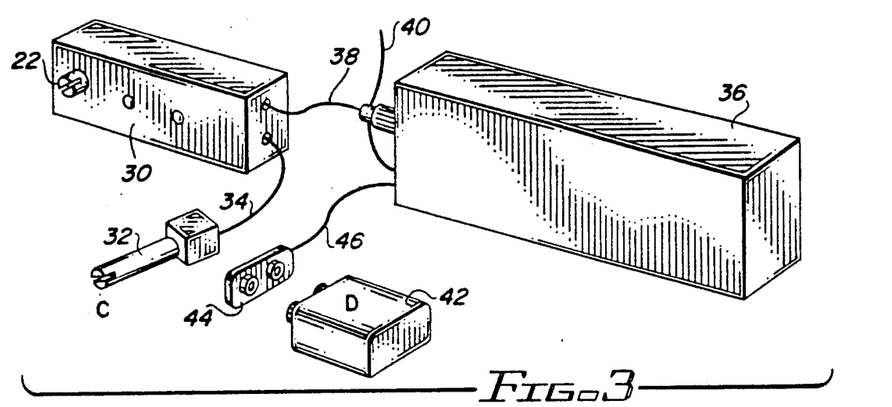
FIG. 3 illustrates representative components for implementing the detection apparatus.

Referring to FIG. 3, there is illustrated a representation of the major components of the present invention which may be installed as original equipment or as retrofit equipment in a wash basin. Module 30 includes a heat sensor or infrared sensor 22/26 (see FIGS. 2a and 2c) that may be penetrably mounted in rear wall 18 of a wash basin 20 (see FIG. 2a) or in spout 16 (see FIG. 2c). For reasons discussed above, the parameters of the field within which sensor 22/26 will detect a heat source represented by a body part is limited to the volume essentially within the wash basin. The sensor produces an output signal and a module 30 may include an amplifier for amplifying the output signal. To establish a threshold of operation for sensor 22/26, a regulating device 32 may be incorporated. The circuit attendant the regulating device may be contained within module 30 and be connected to the regulating device via conductor 34. The regulating device permits establishment of a threshold temperature for the sensor to accommodate variations in ambient temperature. A module 36, interconnected with module 30 through an electrical conductor or cable 38, includes timing circuitry for generating a control signal to provide power to actuate a water valve controlling the water flow through spout 16. Circuitry for deactuating the water valve, along with a time delay to minimize false actuations, are also contained within module 36. Because a certain amount of power is required to deactuate or close the water valve, it is mandatory that sufficient power be available to perform this function. Accordingly, a fail safe circuit may be contained within module 36 to lock the water valve in the off or closed position when the source of power drops below a predetermined voltage (for example, 7.5 volts if a standard 9 volt battery is used). A conductor 40 conveys electrical power to the water valve (not shown).

A characteristic of active detection systems is the transmission of a signal which is reflected from a triggering object to a receiver. Such transmission requires a substantial amount of power. A passive system is one in which a signal is received from the triggering element. For this reason, the power demand of a passive system is substantially less than that of an active system. Since the present invention is a passive system, and by careful circuit design, very little power is required for operation. To further reduce the power demand, low power consumption programmable microchip technology may be employed, as discussed in further detail below. Power consumption can be further reduced by having the system operate in a standby state until the presence of a human body part within the detector field triggers operation of the various control and timing functions. For this reason, a conventional nine (9) volt battery 42 may be used as a power supply. The battery is electrically connected to module 36 via a conventional clip 44 and electrical conductors 46.

Figure 4:
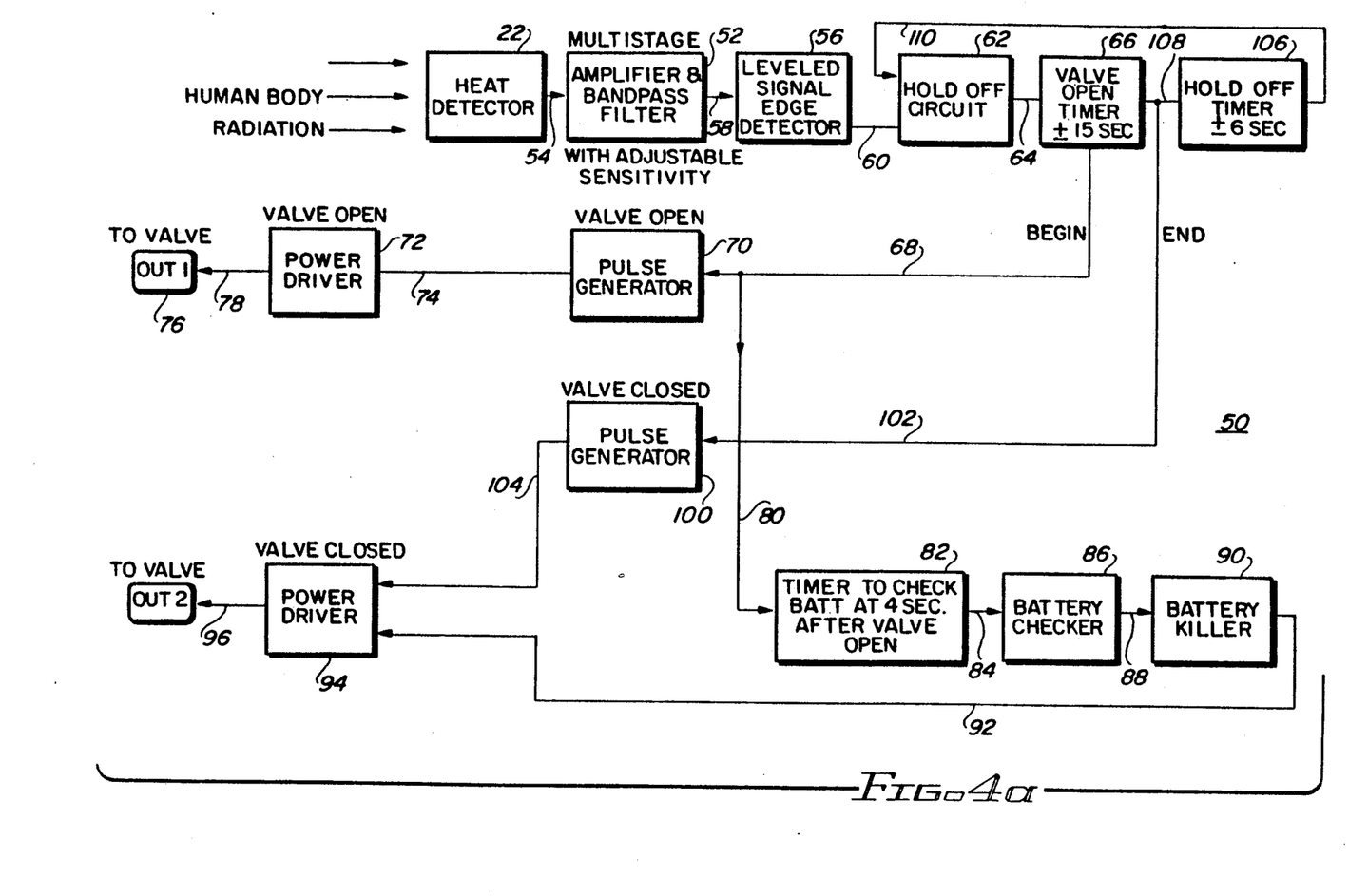

Referring to FIG. 4a, there is illustrated a block diagram of a discrete component circuit and operation of detection system 50. Heat detector or sensor 22/26 is a dual element pyro electric heat detector specifically intended for battery operated passive detection systems. It has differentially connected dual elements which provide immunity from background radiation and noise. The spectral response of the sensor is in the range of five to fifteen $\mu m$; this is the range of the wave length of the infrared rays emitted by heat radiation from a human body part. The frequency range is 0.1 to 20 Hz; such low frequency range essentially eliminates any influence from ambient or expected acoustic noise sources. The quiescent power drain of the sensor is approximately 10 $\mu A$ and represents a very low current drain. The dual elements are combined with a single impedance converting amplifier specially designed to require a low voltage power supply and the amplifier has a low current consumption. An output signal is provided by the sensor only upon occurrence of an imbalance of radiation impinging upon the dual elements. More particularly, the sensor contains ceramic plates sensitive to radiant heat and serving as electric dipoles permanently polarized which change polarity only upon a sudden change in voltage potential across the electrodes resulting from a sudden change of temperature. Since the sensor is not sensitive to ambient temperature, but only to a sudden change of temperature, the sensor is self adjusting and accommodates slow changes in ambient temperature. More specifically, one of the ceramic plates reacts to the ambient temperature while the other plate is subjected to heat irradiating from the human body. This change in temperature registered by the plates generates an output signal.

The output signal generated by sensor 22/26 is transmitted to a multistage circuit 52 including an amplifier to amplify the low level output signal generated by the sensor and a band pass filter. Means may be incorporated to permit adjustment of the threshold of the output signal received from sensor 22/26 and amplified by use of regulating device 32 (see FIG. 3) or the like. A signal edge detector 56 detects positive and negative variations of a magnitude greater than a predetermined threshold of the signal received from multistage circuit 52 via conductor 58. The output of the signal edge detector is transmitted through conductor 60, hold off circuit 62 and conductor 64 to valve open timer 66 when the hold off circuit is not active.

The output of the valve open timer is transmitted via conductor 68 to pulse generator 70. On receipt of the output signal, the pulse generator will activate power driver 72 via conductor 74. The power driver will provide power to an electromagnetic valve, represented by numeral 76, to open the valve and permit water flow through spout 16. The output from valve open timer 66 is also transmitted via conductor 80 to a four (4) second timer 82. After valve 76 has been open for approximately four (4) seconds, timer 82 will transmit a signal via conductor 84 to a battery checker 86. The function of the battery checker is to determine whether the power supply (battery) is maintaining a voltage above a predetermined level during energization of valve 76. Power driver 94 and closure of the valve require a predetermined amount of electrical power. Such power level can be translated to a minimum acceptable voltage at the power supply or battery if the characteristics of the power supply or battery are known. In the event the voltage sensed is below the predetermined value, an output is provided via conductor 88 to a battery killer circuit 90. The function of the battery killer circuit is to generate a control signal for transmission via conductor 92 to power driver 94. On energization of power driver 94, an output signal is generated and transmitted via conductor 96 to close the water valve. This procedure will ensure that the water valve will not remain open due to a power drain or low voltage at the power supply.

Valve open timer 66 also determines the time during which the valve will remain open. On completion of this time period (nominally 20 seconds), a further output signal is generated and transmitted to pulse generator 100 via conductor 102. The pulse generator will provide a signal via conductor 104 to power driver 94 to close the valve. The second output signal is also transmitted to hold off timer 106 via conductor 108. The purpose of the hold off timer is to provide a delay of approximately six (6) seconds before the valve can be opened again. Hold off timer 106 transmits a signal to hold off circuit 62 via conductor 110 to preempt or inhibit transmission of a signal via conductor 64 to valve open timer 66 prior to expiration of the delay period.

Figure 4B:
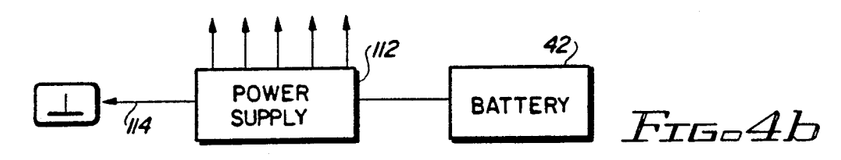
Figure 5:
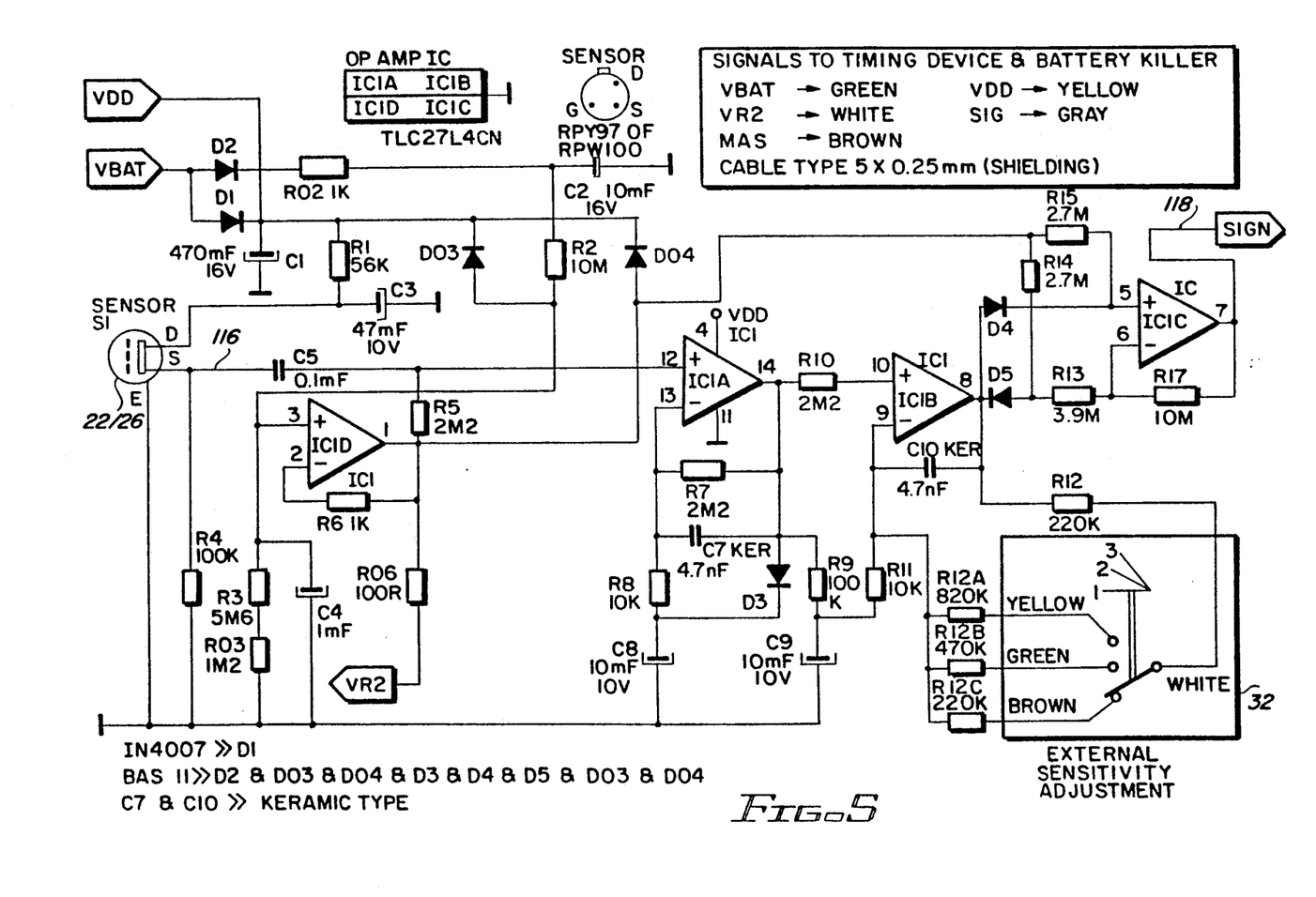
FIG. 5 illustrates representative discrete components of receiver and the amplifier circuits useable with the detection system.

FIG. 4b provides a representation in block diagram form of battery 42 energizing a power supply bus 112 from which a plurality of conductors extend to various components of detection system 50. The power supply is grounded, as represented by conductor 114.

FIGS. 5 through 8 illustrate the arrangement, identification of components and component values of discrete component circuitry represented by the block diagram illustrated in FIGS. 4a and 4b. Since a circuit designer of ordinary skill in the art could build and use these circuits as a result of the detailed information contained therein, a detailed description of the signal paths and functions of the various components need not be undertaken. Instead, certain features of these circuits will be highlighted in the discussion below. The output signal of sensor 22/26 (S1) appears on conductor 116. This output signal is detected and amplified by the operational amplifiers and a usable output signal is produced on conductor 118. Regulating device 32 (see also FIG. 3) provides a trilevel sensitivity adjustment to accommodate for varying degrees of sensitivity desired. This is achieved by varying the feedback across operational amplifier IC1B.

Figure 6:
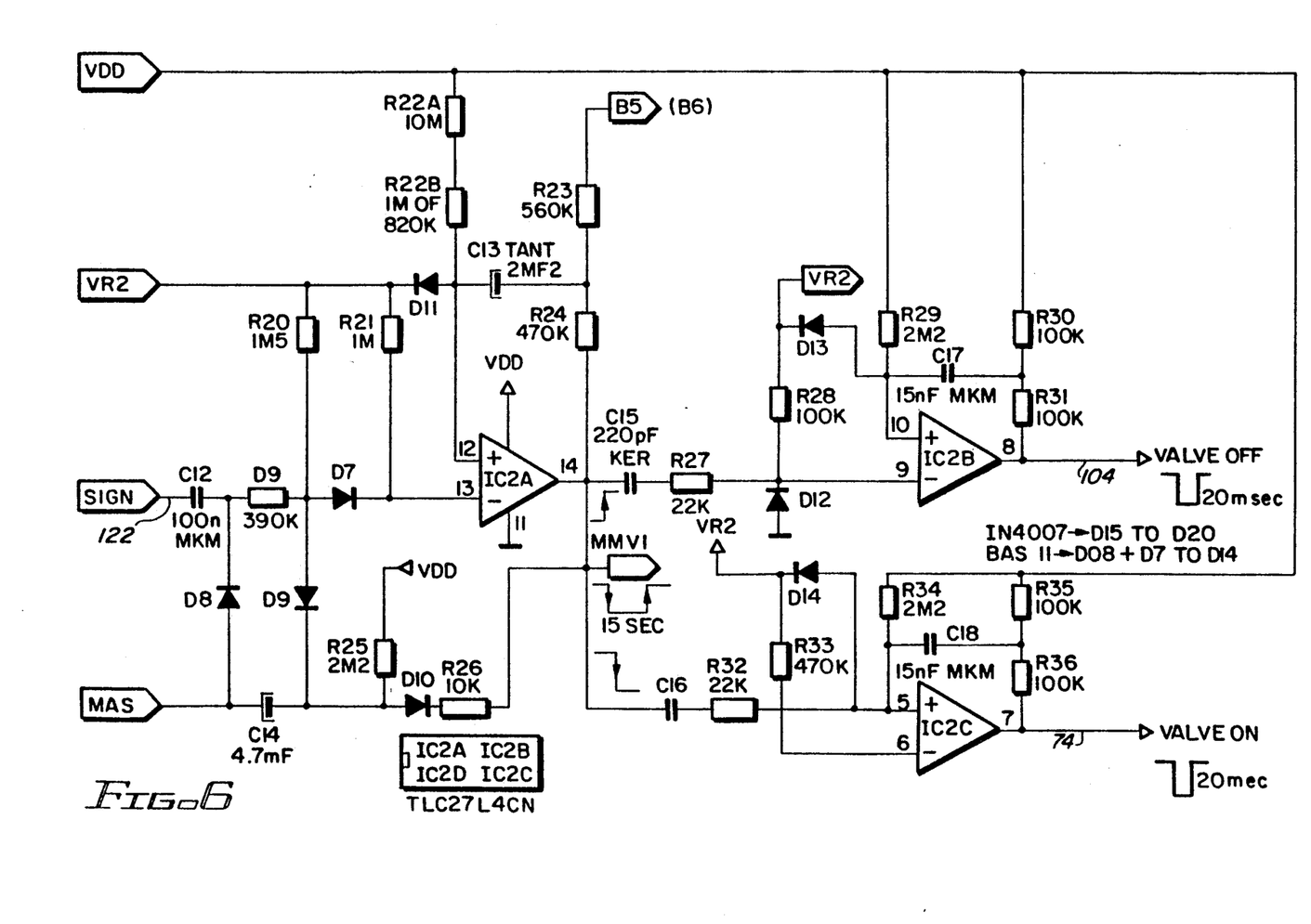
FIG. 6 illustrates discrete components of a timer control for the detection system.
Figure 7:
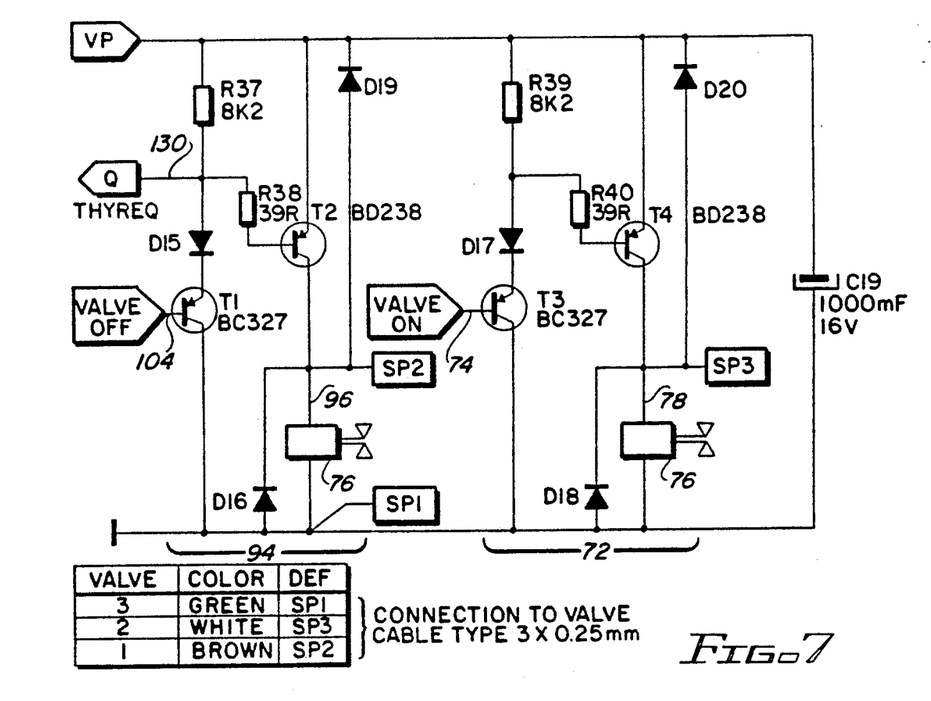
FIG. 7 illustrates discrete components of a power output circuit for the detection system.

FIG. 6 illustrates the circuit for detecting the leading edge of the output signal on conductor 118, holdoff circuit 62, valve open timer 66 and pulse generators 70,100. The output of the pulse generators is transmitted via conductors 74,104 to power drivers 72,94, respectively, illustrated in FIG. 7. Power applied via conductor 78 to valve 76 from power driver 72 will open the valve. Similarly, power provided on conductor 96 to valve 76 will close the valve.

Figure 8:
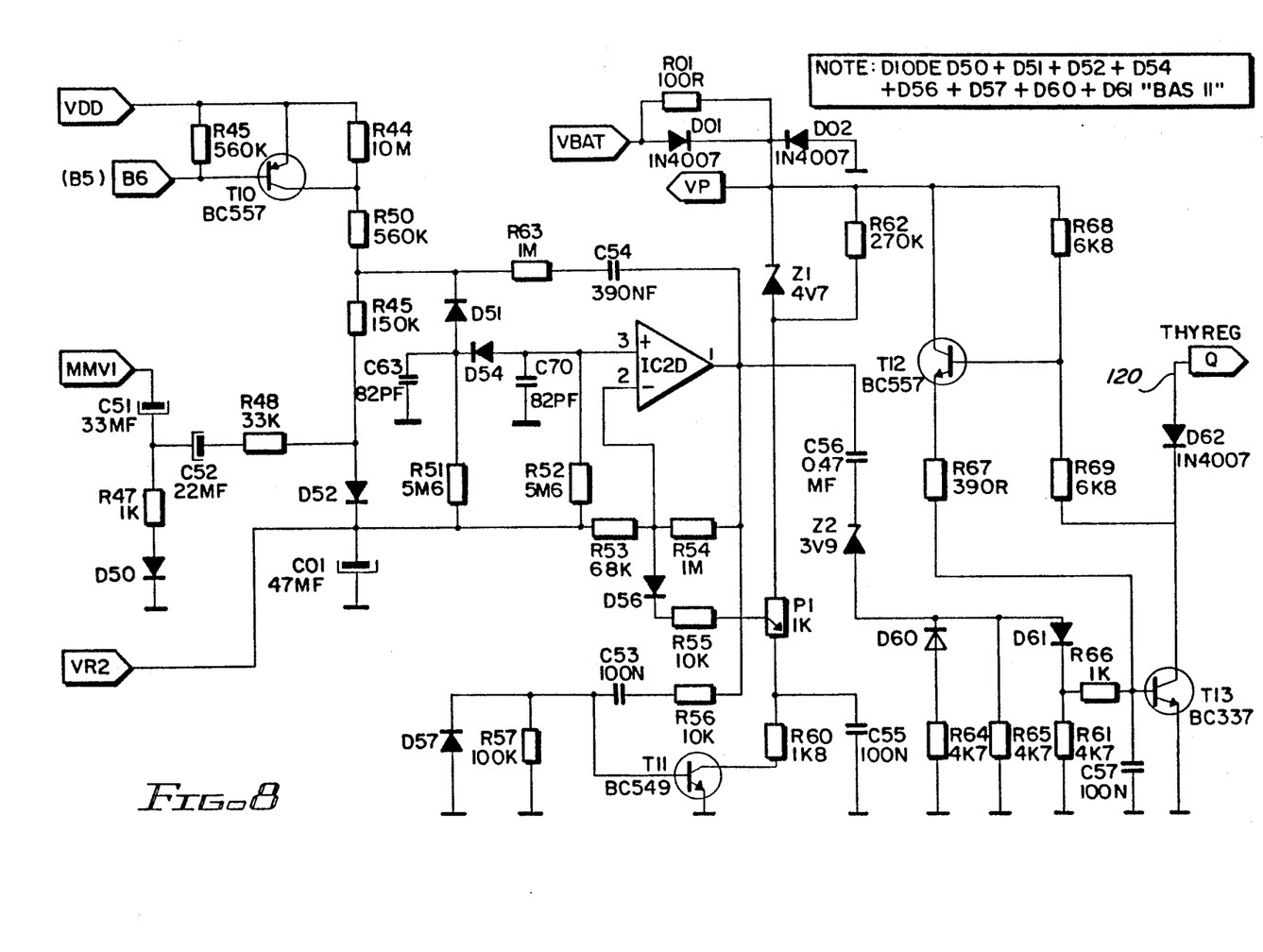
FIG. 8 illustrates discrete components of a battery killer circuit for the detection system.

A signal appearing as output MMVI in FIG. 6 is transmitted to the circuit shown in FIG. 8. This circuit performs the function of checking the voltage of the power supply (battery). Upon determining that the voltage of the power supply is below a predetermined limit, an output signal will appear on conductor 120. This signal is transmitted to the power output circuit illustrated in FIG. 7. An output signal on conductor 120 will cause transistor T2 to conduct and the resulting signal conveyed along conductor 96 to valve 76 will turn off the valve. Moreover, the valve will be maintained off until the battery is replaced.

A presently available nine (9) volt lithium battery has a capacity of 1.1 Ah which corresponds with 3,960 Asec. In the standby state, detection system 50 draws approximately 100 μA; which corresponds with 8.64 Asec. per day (100 μA × 86400 sec/day). By adding the current demands of the detection system during operation and the current drawn by the solenoid valve upon actuation, both of which are a function of the number of cycles per day, a table can be constructed to establish the useful life of the battery as a power supply. Such a table appears below:

| CYCLES/ DAY | QUIESC. CURRENT | OPERATING CURRENT | SOLENOID | TOTAL | BATTERY LIFE |
| --- | --- | --- | --- | --- | --- |
| 40 | 8.64 Asec | 0.084 Asec | 0.48 Asec | 9.204 Asec | $\frac{3,960}{9.204} = 430$ days |
| 60 | 8.64 Asec | 0.126 Asec | 0.72 Asec | 9.486 Asec | $\frac{3,960}{9.486} = 417$ days |
| 100 | 8.64 Asec | 0.21 Asec | 1.2 Asec | 10.05 Asec | $\frac{3,960}{10.05} = 394$ days |

It is therefore evident one can expect at least a year of use before replacement of the battery will be necessary.

There is a growing demand by industry, governments and various commercial interests to install individual automatically operating faucets. At such locations, the space available for sensors, electronic circuitry and power supplies is at a premium. To meet this need, apparatus has been developed for mounting the control circuitry within the faucet spout itself. Such mounting eliminates constraints placed upon the wash basin and upon supporting and ancillary equipment attendant the wash basin and its mounting. Miniaturization can be achieved, as described hereinafter, with a programmed (programmable) microchip and a printed integrated circuit having surface mounted components. Within this technology, the fixed value components are generally surface mounted while the variable components or parameters are programmed in a microchip. Such miniaturization permits combining the elements or their equivalents and the functions performed by modules 30 and 36 (see FIG. 3) on a microchip in combination with sensor 22/26. Thereby, the mounting space is reduced and it becomes feasible to mount the sensor and its control circuitry within the spout of a water basin or the like.

As described above, a water flow cycle of twenty (20) seconds with a six (6) second delay between cycles provides adequate and satisfactory results. However, such predetermined time periods do not optimize water conservation. By turning the water flow on and off automatically as a function of actual use, further water conservation can be effected. To eliminate continuing water flow due to a foreign object within the detection field or to prevent cessation of water flow when a user is momentarily out of the detection field, special parameters must be accommodated.

The water flow is initiated upon sensing of a human body part within the detection field and the water flow will continue for a preset time period unless otherwise modified. Interruption of the water flow will occur if a human body part is not sensed within the detection field for a discrete period of time, such as approximately 2.5 seconds. This time period will preclude cessation of water flow during a momentary removal of the human body part from within the detection field and yet bring about a cessation of water flow when a user would normally be performing another function on completion of washing the body part. A time delay between water flow initiation periods can be preserved to reduce the likelihood of rapid on/off cycling due to abuse. Because of the programmability of the microchip, numerous other functions can be initiated and controlled as a function of the sensing of a human body part within the detection field. These functions include automatic soap dispensing, automatic actuation of air dryers, automatic dispensation of hand towels, water temperature control, light actuation, air exhaust, and various building facility control functions. As described above, the microchip can be mounted almost anywhere when space is at a premium.

Figure 9A:
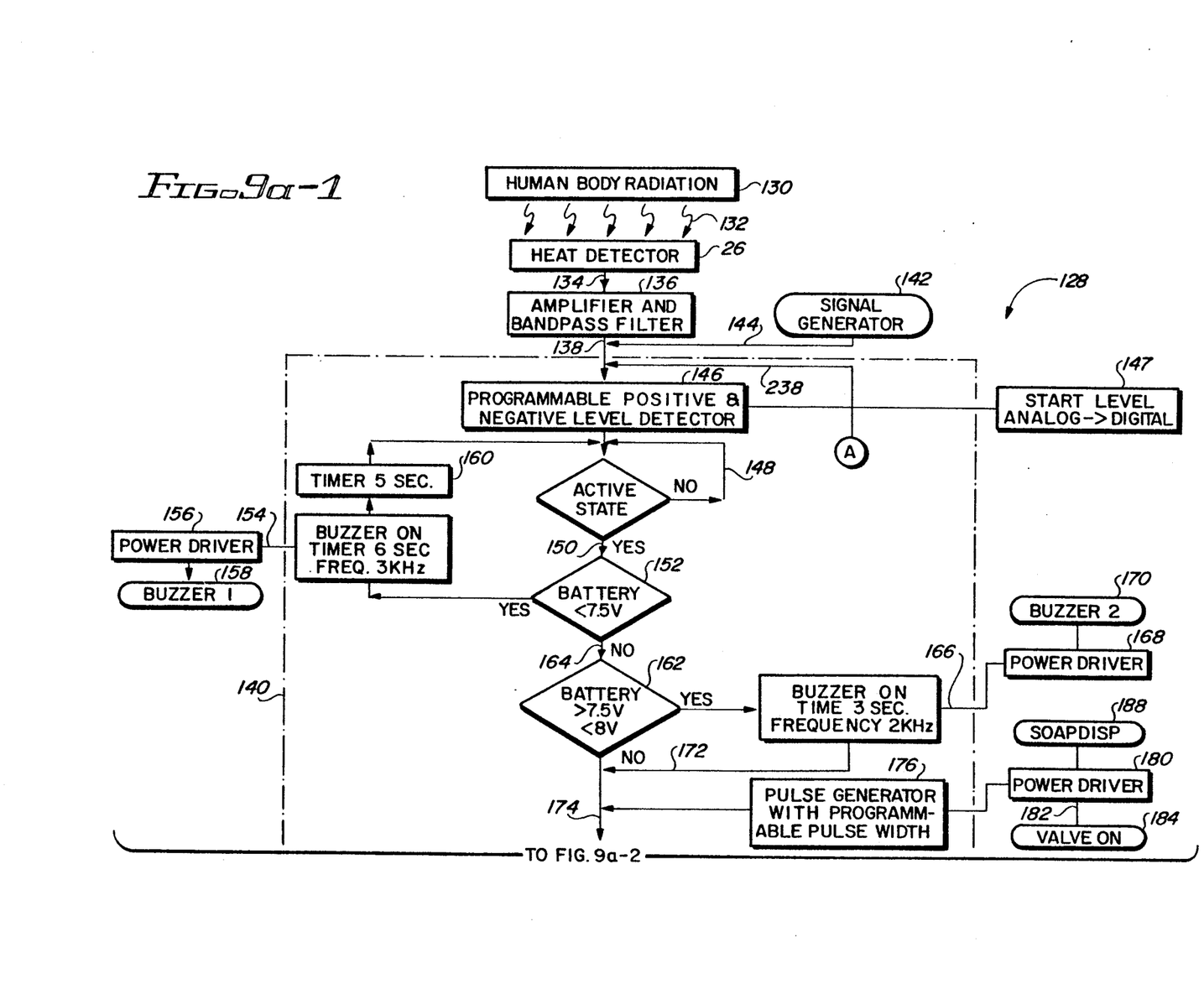

Referring to FIG. 9, there is shown various components and a flow diagram of the functions performable by a miniaturized and programmable version of the previously described apparatus. In variant 128 shown in FIG. 9, a human body part, represented by block 130, emits radiation, represented by arrows 132. The transmitted radiation is sensed by sensor 22/26 provided that the human body part is within detection field 20 (see FIGS. 2a to 2c) of the sensor. The output signal from sensor 22/26 is transmitted through conductor 134 to an amplifier and band pass filter 136.

The variant of the passive system illustrated in FIG. 9 is normally in its standby state, which requires a very, very low power demand. Hence, until sensor 22/26 detects the presence of a human body part, minimal demands are made upon the power supply. As described previously, the variant is passive, which means that it does not generate a signal for transmission to determine the presence of an object of interest. Instead, the variant simply receives and detects receipt of radiation in a limited frequency range. Furthermore, the detection field can be limited or expanded as a function of sensor 22/26 and any restrictor used in conjunction therewith to limit or modify the horizontal and vertical parameters of the detection field. Such limited detection field will prevent spurious actuation which unnecessarily draws power. Moreover, with the limited detection field, the sensitivity of sensor 22/26 can be optimized for the environment and for utilitarian purposes.

In response to the presence of a human body part sensed by sensor 22/26, a signal is transmitted along conductor 134 to amplifier and band pass filter 136. The output signal therefrom is present on conductor 138 and is transmitted to a microprocessor control circuit 140. Generator 142 provides a sense signal having a voltage of 2.5 volts. This signal is transmitted along conductor 144 and is combined with the output signal from amplifier and band pass filter 138; the combined signal is transmitted to programmable positive and negative level detector 146 within control circuit 140. This detector has a variable plus and minus voltage threshold, which threshold is settable by, for example, a pair of external pins associated with block 147. Depending upon the setting of these pins as shown in the chart below,

| Pin 1 | Pin 2 | (−) ← 2.5 v → (+) | |
|---|---|---|---|
| 0 | 0 | 1.00 V | 4.00 V |
| 1 | 0 | 1.25 V | 3.75 V |
| 0 | 1 | 1.50 V | 3.50 V |

-continued

| Pin 1 | Pin 2 | (−) ← 2.5 v → (+) | |
|---|---|---|---|
| 1 | 1 | 1.75 V | 3.25 V | the sensitivity is varied. Depending upon the degree of excursion from 2.5 volts, the standby mode will or will not be maintained.

Because different environments are contemplated with different levels necessary to generate an effective and actuating detection signal, the thresholds of sensitivity are adjustable. If the signal detected by detector 146 is not higher or lower than the values set as a function of the position of pins 1 and 2 in block 147, control unit 140 will remain in the standby state, as reflected by path 148. If the signal is greater or lower than the values set, control unit 140 will proceed to an active state, as reflected by path 150.

To ensure availability of sufficient power to perform the functions necessary, the battery voltage is sensed, as reflected by interrogator 152. Should the voltage be less than 7.5 volts, a signal is generated on conductor 154 for a time period, such as six (6) seconds. This signal will actuate power driver 156 which provides power to a peripheral buzzer 158, which buzzer may have a frequency of 3 kHz. As noted, power driver 156 and buzzer 158 are external to control unit 140. Simultaneously, a timer 160 is actuated to provide a five (5) second delay before variant 128 will proceed to the active state from the passive state.

In the event the battery voltage is in the range of 7.5 volts to 8 volts, as determined by interrogator 162 via path 164, a signal is generated and transmitted along conductor 166 to power driver 168 which provides power to buzzer 170. This buzzer will emit a 2 kHz tone for a period of three (3) seconds to provide a warning to an operator. Both power driver 168 and buzzer 170 are external to control unit 130. Since this voltage range is acceptable, an enabling signal is transmitted along path 172 to permit resumption of the active state of variant 128. On receipt of an enabling signal via path 174, a pulse generator 176 having a programmable pulse width generates an output signal conveyed on conductor 178 to power driver 180. The power driver provides, via conductor 182, electrical power to turn valve 184 on. Simultaneously, the power driver may be electrically connected via conductor 186 to energize soap dispenser 188. Under control of timer 190, power driver 180 will be actuated to maintain valve 184 on for at least five (5) seconds. After the five second interval, an output signal may be generated by timer 190 to energize pulse generator 192 via path 194 to actuate power driver 196 connected to dryer 198 via conductor 200.

Interrogator 202 receives a signal via path 204 while control unit 140 is in the active state. The interrogator is programmable to provide a timing function of 15, 20, 25 or 30 seconds. If a signal is generated by sensor 22/26 on completion of the initial 5 second period, an output is provided on path 206 Such output will continue for the set period of 15–30 seconds. An interrogator 208 determines whether control unit 140 has been programmed to remain in the active state for a fixed period of time. If not, a signal is provided on path 210. The signal along path 210 is provided to a programmable positive and negative level detector 212. External to control unit 140 is a signal generator 214 which provides a median output signal of 2.5 volts on conductor 216, which conductor provides an input to detector 212. Generator 214 includes a pair of pins or switches settable to provide for discrete voltage ranges above and below the median voltage of 2.5 volts, as indicated in the table below.

| Pin 1 | Pin 2 | (−) ← 2.5 v → (+) | |
|---|---|---|---|
| 0 | 0 | 1.5 V | 3.5 V |
| 1 | 0 | 1.7 V | 3.3 V |
| 0 | 1 | 1.9 V | 3.1 V |
| 1 | 1 | 2.1 V | 2.9 V |

In the event detector 212 senses a voltage level between one of the four set ranges of voltage for a period of one (1) second, as determined by interrogator 218, an indication exists that a human body part is no longer within the detection field sensed by sensor 22/26. This results from the lack of excursion of the voltage beyond the limits of the sensitivity range set and the need for continuing water flow is not present. An output signal will then be conveyed along path 220 to path 222. A signal on path 222 will energize pulse generator 224 to produce an output signal on conductor 226. A signal on conductor 226 will energize power driver 228 and provide an output signal on conductor 230 to turn off water valve 232.

In the event detector 212 detects a voltage level either above or below the threshold voltages, interrogator 218 will generate an enabling signal on path 234 to permit control unit 140 to remain in the active state. Similarly, if interrogator 208 determines that the water valve has been programmed to remain on for a set period of time and if such period of time has not elapsed, an enabling signal will be generated and conveyed along path 234 to maintain control unit 140 in the active state. On completion of the time period set by interrogator 202 or upon other shutoff signal generated for valve 232, programmable hold off timer 236 will be enabled. This timer provides a settable delay of 2.5 or 5 seconds via path 238 before detector 146 can be enabled to switch control unit 140 from the passive state to the active state.

Interrogator 202 includes a settable timed period, which period may be set by two switches on external pins in accordance with the table below:

| Pin 1 | Pin 2 | |
|---|---|---|
| 0 | 1 | 15 seconds |
| 1 | 0 | 20 seconds |
| 0 | 1 | 25 seconds |
| 1 | 1 | 30 seconds |

Thus, interrogator 202 can be set for a maximum period of water flow. Furthermore, interrogator 202 includes a further pin which will permit disregard of voltage levels necessary for detector 212 to provide a signal to continue water flow. Thus, interrogator 202 can be set to provide a predetermined water flow time period irrespective of continuing sensing of the presence of a human body part within the detection field sensed by sensor 22/26.

Timer 236 can be settable by a switch or pin to delay for a preset time period, or recovery time, return of control unit 140 to an active state.

Figures 9A, 9B:
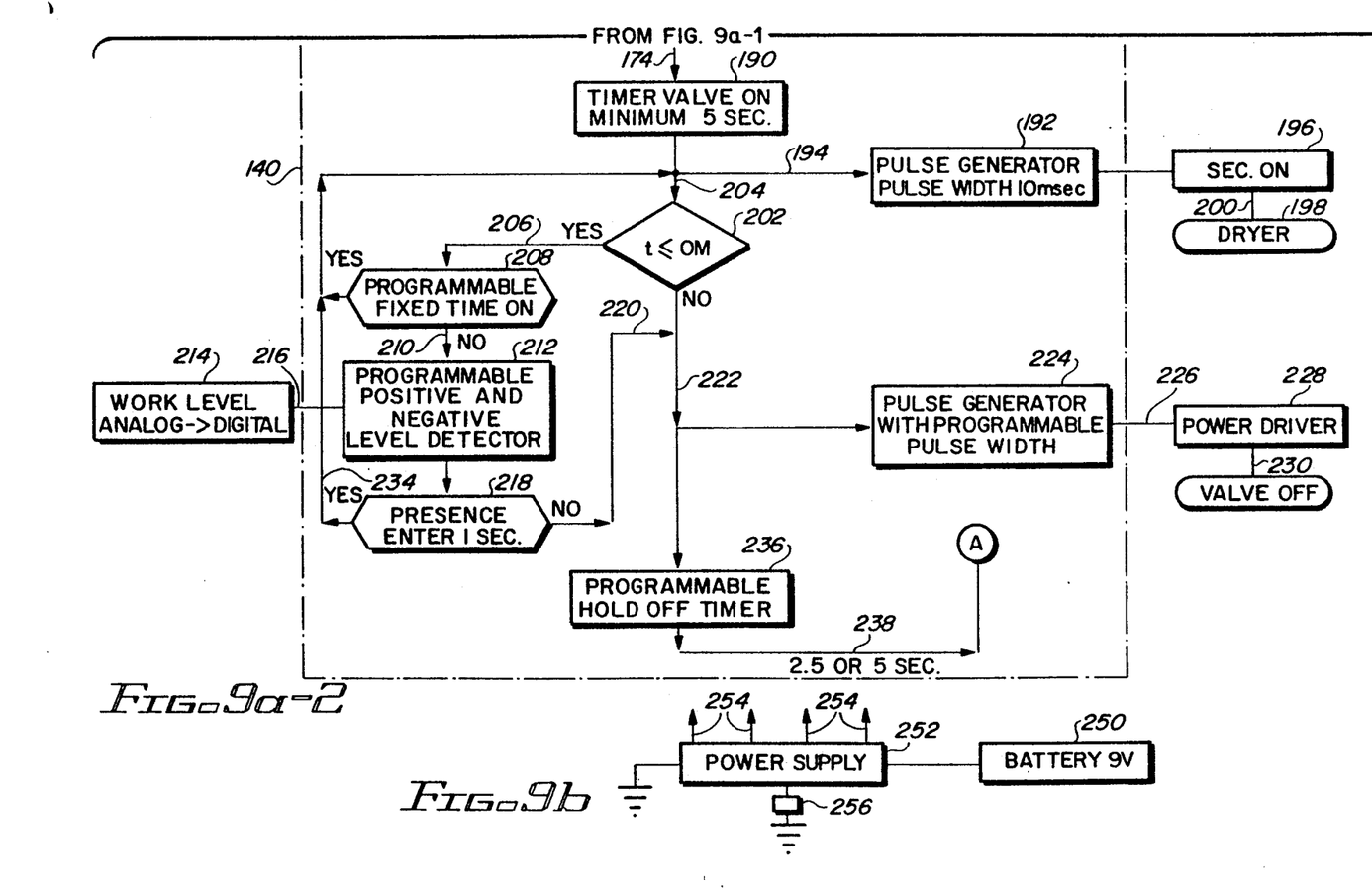

As shown in FIG. 9b, power is provided by a 9 volt battery 250. The battery supplies power to power supply 252 from which electrical power is distributed through a plurality of conductors 254. A reset 256 includes a counter which will count up to 32 seconds, at which time a pulse is transmitted to generator 224 to turn off valve 232. On completion of this pulse, nominally 20 milliseconds (msec), control unit 140 is reset and it becomes operational.

Control unit 140 along with the ancillary equipment controlled and operated thereby has been specifically designed to minimize current demand. Based upon computation of current demand, the following table reflects the operating time available from a single 9 volt 1.1 Ah battery:

| CYCLES/ DAY | QUIESC. CURRENT | OPERATING CURRENT | SOLENOID | TOTAL | BATTERY 1.1 Ah | LIFE-DAYS | LIFE-YEARS |
|---|---|---|---|---|---|---|---|
| 40 | 3.1968 Asec | 0.04 Asec | 0.42 Asec | 3.6568 Asec | 3,960 | 1082 | 3.0 |
| 60 | 3.1968 Asec | 0.06 Asec | 0.63 Asec | 3.8868 Asec | 3,960 | 1019 | 2.8 |
| 100 | 3.1968 Asec | 0.10 Asec | 1.05 Asec | 4.3468 Asec | 3,960 | 911 | 2.5 |

As will be evident from this table, use of the present invention prior to battery change is expected to be well in excess of two years. Such effective battery life will permit use at remote locations and at locations where battery replacement is difficult or inconvenient.

Figure 10:
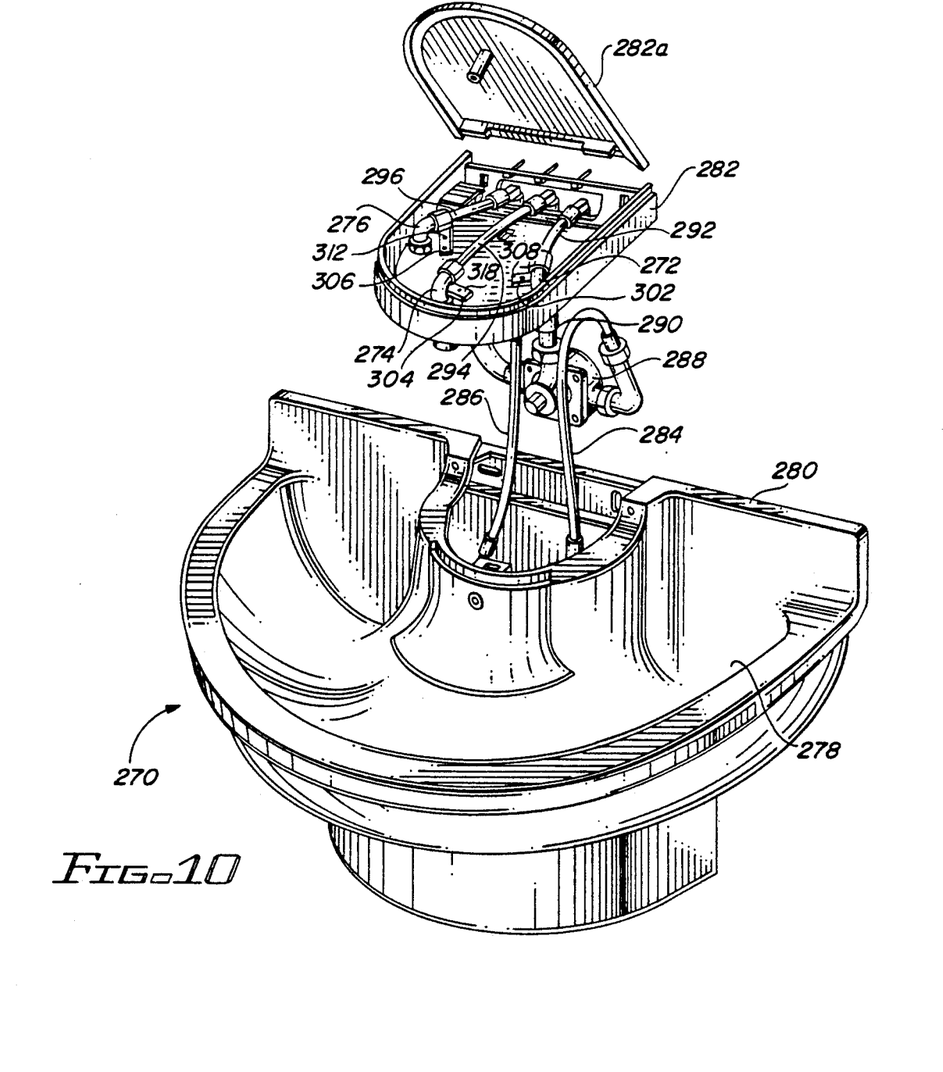
FIG. 10 illustrates a configuration of three detection systems mounted on a three user positions washbasin.

Referring to FIG. 10, there is illustrated a three user position wash basin 270 which may incorporate the present invention to control and regulate operation of each of three water spouts 272, 274 and 276 as a function of the presence of a user (body heat) in proximity to the respective user position about the wash basin. The wash basin includes a generally semicircular bowl 278 having a splash panel 280 to accommodate locating the wash basin against a wall. In a wash basin of this configuration, the three user positions are the front center, and the right and left sections rearwardly of center. Spouts 272, 274 and 276 are located within an overhanging cabinet 282, including a cover 282a, in general correspondence with the user positions. A source of hot and cold water may be provided through hoses 284, 286 from respective sources to a mixing valve 288. The output of the mixing valve may be conveyed through a pipe 290 to a manifold or the like (not shown). Three conduits, 292, 294 and 296 extend from pipe 290, or an attached manifold, to interconnect spouts 272, 274, 276, respectively, with pipe 290. In conjunction with each spout, a sensor 302, 304 and 306 may be mounted in the respective one of modules 308, 310 and 312. These sensors may be of the type discussed above and identified by numerals 22 or 26. Furthermore, restrictors may be incorporated with the sensors to focus the detection field at and about each respective user position. The control and regulatory circuitry attendant each sensor may be mounted upon a microchip, as discussed above, to provide programmed and programmable functions. Each of these microchips may be mounted upon or as part of the respective one of modules 308, 310 and 312. Thus, the control and regulatory circuitry in conjunction with the respective one of the sensors may be located adjacent the respective one of spouts 272, 274 and 276.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I claim:

1. A passive apparatus for controlling the operation of a fluid flow control valve in response to the presence of a human body part, said apparatus comprising in combination:
   a) a sensor for detecting heat radiating from a human body part within a predetermined detection field and for producing an output signal in response to such detection;
   b) means for opening the valve to permit fluid flow therethrough;
   c) means for closing the valve;
   d) a low voltage power source for energizing said apparatus;
   e) means for determining the voltage of said power source;
   f) means responsive to the output signal for comparing the determined voltage with at least one predetermined voltage and for generating a control signal responsive to the difference between the determined voltage and the predetermined voltage;
   g) means for enabling said opening means in response to a control signal generated and reflective of a determined voltage greater than the predetermined voltage; and
   h) means for providing a signal to enable said closing means.

2. The apparatus as set forth in claim 1 including means for preempting opening of the valve for a set time period subsequent to closing of the valve.

3. The apparatus as set forth in claim 1 including means for delaying opening of the valve for a set period of time subsequent to generation of the control signal.

4. The apparatus as set forth in claim 1 including means for providing an alarm in response to a control signal generated and reflective of a determined voltage less than a specific predetermined voltage.

5. The apparatus as set forth in claim 1 wherein said sensor is a bipolar element having a first element responsive to the ambient temperature and a second element responsive to heat radiated from the body part and including means for generating an output signal in response to a change in temperature between the first and second elements.

6. The apparatus as set forth in claim 1 wherein said power source is a nine volt battery.

7. The apparatus as set forth in claim 1 including means for regulating the sensitivity of said sensor.

8. The apparatus as set forth in claim 1 including a wash basin, a soap dispenser associated with said wash basin and means for actuating said soap dispenser in response to the control signal.

9. The apparatus as set forth in claim 1 including a wash basin, a dryer and means for actuating said dryer in response to the control signal.

10. The apparatus as set forth in claim 9 including a soap dispenser and means for actuating said soap dispenser in response to the control signal.

11. The apparatus as set forth in claim 1 including a basin, a spout for discharging fluid into said basin and means for mounting said sensor as part of said spout.

12. The apparatus as set forth in claim 11 wherein said basin includes a bowl for defining at least a part of the detection field.

13. The apparatus as set forth in claim 1 including means for monitoring the continuing presence of heat radiating from the human body part and means for actuating said providing means to close the valve after a predetermined period of time of absence of heat radiating from the human body part.

14. The apparatus as set forth in claim 1 including means for enabling said providing means after a predetermined time period.

15. The apparatus as set forth in claim 1 wherein said determining means, said comparing and generating means, said enabling means and said providing means are mounted upon a common microchip.

16. The apparatus as set forth in claim 15 wherein said sensor is mounted in a module common with said microchip.

17. A passive method for controlling the operation of a fluid flow control valve in response to the presence of a human body part, said method comprising the steps of:
   a) detecting heat radiating from a human body part placed within a predetermined detection field and producing an output signal in response to said step of detecting;
   b) opening the valve to permit fluid flow therethrough;
   c) closing the valve;
   d) energizing the control and operation of the valve with a low voltage power source;
   e) determining the voltage of the power source;
   f) comparing the voltage determined during said step of determining with at least one predetermined voltage in response to the output signal and generating a control signal responsive to the difference between the determined voltage and the predetermined voltage;
   g) enabling opening of the valve in response to a control signal generated and reflective of a determined voltage greater than a specific predetermined voltage; and
   h) providing a signal to enable exercise of said step of closing.

18. The method as set forth in claim 17 wherein the valve is part of a wash basin for controlling the flow of water through a spout feeding the wash basin and wherein said steps of detecting, determining, comparing, enabling and producing are exercised at the spout.

19. The method as set forth in claim 17 including the step of setting the time period prior to exercise of said step of closing.

20. The method as set forth in claim 17 including the step of delaying exercise of said step of opening for a set time period.

21. The method as set forth in claim 17 including the step of generating a further control signal reflective of a determined voltage less than a specific predetermined voltage and the step of energizing an alarm in response to the further control signal.

22. The method as set forth in claim 17 wherein the valve is used in conjunction with a wash basin having a soap dispenser and including the step of actuating the soap dispenser.

23. The method as set forth in claim 17 wherein the valve is used in conjunction with a fluid dispensing spout located in proximity to a dryer and including the step of actuating the dryer.

24. The method as set forth in claim 17 including the step of monitoring the continuing presence of heat radiating from the human body part and exercising said step of providing upon absence from within the detection field of the human body part for a set period of time.

* * * * *